United States Patent
Mori

[11] Patent Number: 5,976,057
[45] Date of Patent: Nov. 2, 1999

[54] GEAR SHIFT TIME AUTOMATIC ADJUSTING APPARATUS IN AUTOMATIC TRANSMISSION

[75] Inventor: Akimasa Mori, Fuji, Japan

[73] Assignee: Jatco Corporation, Fuji, Japan

[21] Appl. No.: 08/932,961

[22] Filed: Sep. 18, 1997

[30] Foreign Application Priority Data

Sep. 27, 1996 [JP] Japan .................................. 8-256890

[51] Int. Cl.$^6$ .................................................. F16H 61/04
[52] U.S. Cl. ........................... 477/150; 477/143; 477/154
[58] Field of Search .................................. 477/150, 143, 477/154, 155, 156, 121

[56] References Cited

U.S. PATENT DOCUMENTS

| | | | |
|---|---|---|---|
| 4,955,256 | 9/1990 | Kashihara et al. | 477/150 X |
| 4,998,451 | 3/1991 | Sano | 477/143 X |
| 5,005,441 | 4/1991 | Narita | 477/150 X |
| 5,163,342 | 11/1992 | Pollack et al. | 477/150 |
| 5,558,598 | 9/1996 | Torimoto | 477/110 |
| 5,573,478 | 11/1996 | Tsukamoto et al. | 477/150 X |

FOREIGN PATENT DOCUMENTS

| | | | |
|---|---|---|---|
| 55-44159 | 3/1980 | Japan | 477/150 |
| 61-116158 | 6/1986 | Japan | 477/150 |
| 1-169164 | 7/1989 | Japan . | |
| 5-99308 | 4/1993 | Japan . | |
| 6-17918 | 1/1994 | Japan | 477/150 |

*Primary Examiner*—Charles A. Marmor
*Assistant Examiner*—Roger Pang
*Attorney, Agent, or Firm*—Foley & Lardner

[57] ABSTRACT

It is detected on the basis of a change in an engine speed whether an out-of shelf condition in which a gear shft time exceeds a predetermined time is caused or not (step S11), and when the out-of shelf condition is caused, a lapping control processing corresponding to first engaging oil pressure setting means is executed so that a correction value is set to increase a line pressure supplied to each kind of engaging elements of an automatic transmission, and that the correction value is decreased as a gear shft load time elapses. At the same time, a learning control processing corresponding to a second engaging oil pressure setting means is executed (step S17) so that a variation of the engaging oil pressure due to the non-uniformity of engaging elements and the deterioration with age is learned, thereby to enable to automatically act a proper line pressure on each kind of engaging elements when either one of the automatic transmission or a controller which controls the automatic transmission is replaced.

8 Claims, 10 Drawing Sheets

| SHIFT POSITION | | REVERSE CLUTCH | HIGH CLUTCH | FORWARD CLUTCH | OVERRUN CLUTCH | BAND SERVO | | | FORWARD ONE-WAY CLUTCH | LOW ONE-WAY CLUTCH | LOW & REVERSE BRAKE | REMARKS |
|---|---|---|---|---|---|---|---|---|---|---|---|---|
| | | | | | | SECOND SPEED CONNECTION | THIRD SPEED RELEASE | FOURTH SPEED CONNECTION | | | | |
| P | | | | | | | | | | | | PARKING |
| R | | ○ | | | | | | | | | ○ | BACKWARD |
| N | | | | | | | | | | | | NEUTRAL |
| D | FIRST SPEED | | | ○ | □ | | | | ● | ● | | AUTOMATIC GEAR SHIFT 1↔2↔3↔4 |
| | SECOND SPEED | | | ○ | ◎ *1 | ○ | | | ● | | | |
| | THIRD SPEED | | ○ | ○ | ◎ | *2 × | × | | ● | | | |
| | FOURTH SPEED | | ○ | × | | *3 × | × | ○ | | | | |
| 2 | FIRST SPEED | | | ○ | □ | | | | ● | ● | | AUTOMATIC GEAR SHIFT 1↔2 |
| | SECOND SPEED | | | ○ | ◎ | ○ | | | ● | | | |
| 1 | FIRST SPEED | | | ○ | ○ | | | | ● | | ○ | FIRST BACK FIXED 1←2 |
| | SECOND SPEED | | | ○ | ○ | ○ | | | ● | | | |

GEAR SHIFT TIME AUTOMATIC ADJUSTING APPARATUS IN AUTOMATIC TRANSMISSION

BACKGROUND OF THE INVENTION

1. Field of the Invention

The present invention relates to a gear shift time automatic adjusting apparatus in an automatic transmission in which a gear shift time in the automatic transmission can be automatically adjusted when the automatic transmission or a control unit (controller) is replaced.

2. Description of the Related Art

A gear shift time automatic adjusting apparatus in an automatic transmission in the prior art is disclosed, for example, in Japanese Patent Laid Open Publication Hei No. 5-99308 (hereinafter, referred to as a "first prior art example) and in Japanese Patent Laid Open Publication Hei No. 1-169164 (hereinafter, referred to as a "second prior art example).

The first prior art example was proposed by the applicant of the present application previously, and in the case where the automatic transmission is brand new, in order to achieve a gear shift in a set required time and to prevent elongation of the gear shift time as well as gear shift shock even when the lapping of friction materials constituting engaging elements is insufficient, a gear shift load applied to the engaging elements is detected, for example by detecting a throttle opening degree, and by accumulating this gear shift load, it is judged that the lapping of the friction materials is insufficient as long as the accumulated gear shift load is small, and an engaging oil pressure of initial characteristic having a higher oil pressure characteristic than a normal condition is applied to compensate for the insufficient lapping of the friction material. Here in the specification, the lapping means to lap or rub the pair of engaging elements, i.e., friction materials with other. In this case, when the lapping is sufficient, i.e., the friction materials are adapted sufficiently, the coefficient of friction of the friction materials is large, and when the lapping is insufficient, i.e., the friction materials are not adapted sufficiently, the coefficient of friction is small.

Furthemore, in the second prior art example, on the basis of an input rotational speed and an output rotational speed of a gear shift gear mechanism during gear shift, an inertia phase time representing a time during which a gear ratio representing a ratio between the input and the output rotational speed is measured at each throttle opening degree by inertia phase time measuring means. A line pressure during gear shift is controlled by line pressure regulating means so that the measured inertia phase time reaches a target value to thereby perform the so-called learning control which copes with the non-uniformity of line pressure control parts and the deterioration with age of the friction materials.

However, in the first prior art example, it is intended to control the engaging oil pressure supplied to the engaging elements on the basis of the accumulated gear shift load value. However, since the accumulated gear shift load value is managed by a controller which is independent of the automatic transmission, when this controller is replaced or the automatic transmission is replaced, an accumulated gear shift load value of a new controller will be different from the value of the previous controller, and thus, it is necessary to modify the accumulated gear shift load value of the new controller to coincide with the previous value. However, this is not only troublesome but also the modification is sometimes forgotten, and satisfactory engaging oil pressure control according to a correct accumulated gear shift load value may not be achieved in some cases. Furthermore, there is another unsolved problem in which it is impossible to cope with the non-uniformity and the deterioration with age of the coefficient of friction of the friction materials of the engaging elements, and the gear shift time will be deviated from a preset gear shift time.

Also, in the second prior art example, the learning control is performed so that an inertia phase time during which a gear ratio is changing coincides with a target value. However, since this learning control is carried out at each throttle opening degree, a fine correction can be made. On the other hand, since the learning is not performed as often at a throttle opening degree whose frequency of occurrence is small, unsolved problem is involved in which optimum control cannot be achieved. Furthermore, in the learning control, on the basis of a current deviation of the gear shift time, the oil pressure of the next time will be corrected, and thus although it is possible to cope with the deterioration with age (gradual change) of the friction materials, it is impossible to cope with large deterioration with age such as insufficient lapping as in the initial time of starting the use of the automatic transmission, and the gear shift time will be deviated from the set gear shift time.

SUMMARY OF THE INVENTION the present invention was made in view of the above-mentioned unsolved problems, and it is an object to provide a gear shift time automatic adjusting apparatus in an automatic transmission which is capable of performing optimum gear shift control by automatically adjusting a gear shift time even when either one of the automatic transmission and the controller is replaced.

In order to achieve the object, in a first aspect of the invention, in an automatic transmission wherein an engaging oil pressure for each kind of friction elements of a gear shift gear mechanism is adjusted by engaging oil pressure adjusting means, and the friction elements are selectively operated to select a predetermined gear shift stage, a gear shift time automatic adjusting apparatus comprises out-of shelf detecting means for detecting whether or not a gear shift time is in an out-of shelf condition in which the gear shift time exceeds a preset shelf time, first engaging oil pressure setting means for setting an engaging oil pressure correction value which increases the engaging oil pressure for the engaging oil pressure adjusting means in order to prevent the out-of shelf, and gear shift control means for controlling the engaging oil pressure adjusting means on the basis of the engaging oil pressure set by the first engaging oil pressure setting means. The first engaging oil pressure setting means includes gear shift load detecting means for detecting a gear shift load applied to the engaging elements, and gear shift load accumulating means for accumulating the gear shift load detected by the gear shift load detecting means, and when an accumulated value of the gear shift load accumulating means is equal to or lower than a predetermined value, the first engaging oil pressure setting means sets the engaging oil pressure correction value which increases the engaging oil pressure at the time of gear shift to become higher than the case where the accumulated value is equal to or larger than the predetermined value, and the gear shift load accumulating means reduces the accumulated value when the out-of shelf detecting means detects the out-of shelf.

In this first aspect of the invention, at the time of performing the gear shift by the gear shift gear mechanism, the gear shift load applied to the engaging elements at that time is accumulated, and when the accumulated value is equal to or lower than the predetermined value, it is judged that the engaging elements is not yet sufficiently adapted to be engaged, and the engaging oil pressure is increased to become higher than the case where the accumulated value is equal to or higher than the predetermined value there by to prevent a variation of the gear shift time due to the insufficient lapping. Furthermore, when the out-of shelf is detected by the out-of shelf detecting means, the accumulated value of the gear shift load is shifted to a smaller value there by to perform the lapping control.

Accordingly, the replacement of one of the automatic transmission and the controller is detected at the controller side based on the determination whether the out-of shelf occurs or not, and satisfactory gear shift time control appropriate to this situation can be achieved.

In the second aspect of the invention, in the first aspect of the invention, further comprises gear ratio change detection means for detecting whether or not the gear ratio in the gear shift gear mechanism is changing, inertia phase time measuring means, when it is detected by the gear ratio change detection means that the gear ratio is changing, for measuring an elapsed time of the gear shift, second engaging oil pressure setting means fo setting an engaging oil pressure correction value of the engaging oil pressure adjusting means so that the measured elapsed time of the inertia phase time measuring means becomes equal to a target value, and gear shift control means for controlling the engaging oil pressure adjusting means on the basis of the engaging oil pressures set by the first engaging oil pressure setting means and the second engaging oil pressure setting means.

In the second aspect of the invention, the lapping control is performed by the first engaging oil pressure setting means, and at the same time, on the basis of the measured time by the inertia phase measuring means, the engaging oil pressure correction value is set by the second engaging oil pressure setting means, and on the basis of the set value, the engaging oil pressure adjusting means is controlled by the gear shift control means, thereby to perform the learning control of the engaging oil pressure of the engaging elements.

Furthermore, in the third aspect of the invention, when the out-of shelf is detected by the out-of shelf detecting means, the gear shift load accumulating means sets the accumulated value to an initial value.

In the third aspect of the invention, since the gear shift load accumulating means sets the accumulated value to the initial value, the gear shift gear mechanism performs the lapping control similar to that for a brand-new condition so that the variation of the gear shift time due to the insufficient lapping is suppressed.

Furthermore, in the fourth aspect of the invention, the first engaging oil pressure setting means reduces the engaging oil pressure correction value smaller as the accumulated value of the gear shift load accumulating means becomes larger.

In the fourth aspect of the invention, when the accumulated value of the gear shift load is small, that is, when the automatic transmission is brand-new and the lapping of the friction materials is insufficient, the engaging oil pressure of the engaging oil pressure adjusting means is made considerably higher than a normal condition thereby to suppress the reduction of the coefficient of friction and to suppress the elongation of the gear shift time. Thereafter, as the friction materials are adapted, i.e. as the coefficient of friction is increased, by gradually decreasing the engaging oil pressure of the engaging oil pressure adjusting means, it becomes possible to appropriately control the engaging oil pressure of the engaging elements, and the elongation of the gear shift time and the occurrence of the gear shift shock are prevented.

Furthermore, in the fifth aspect of the invention, the gear shift load detection means is constituted by throttle opening degree detecting means for detecting a throttle opening degree, and the gear shift load accumulating means accumulates a value corresponding to the throttle opening degree during gear shift.

In the fifth aspect of the invention, since the gear shift load is detected on the basis of the detection value of the throttle opening degree detection means, it is possible to easily detect the gear shift load by using detection means which is equipped to a usual vehicle.

DESCRIPTION OF THE PREFERRED EMBODIMENTS

Hereinafter, embodiments of the present invention will be described with reference to the drawings.

Figure 1:
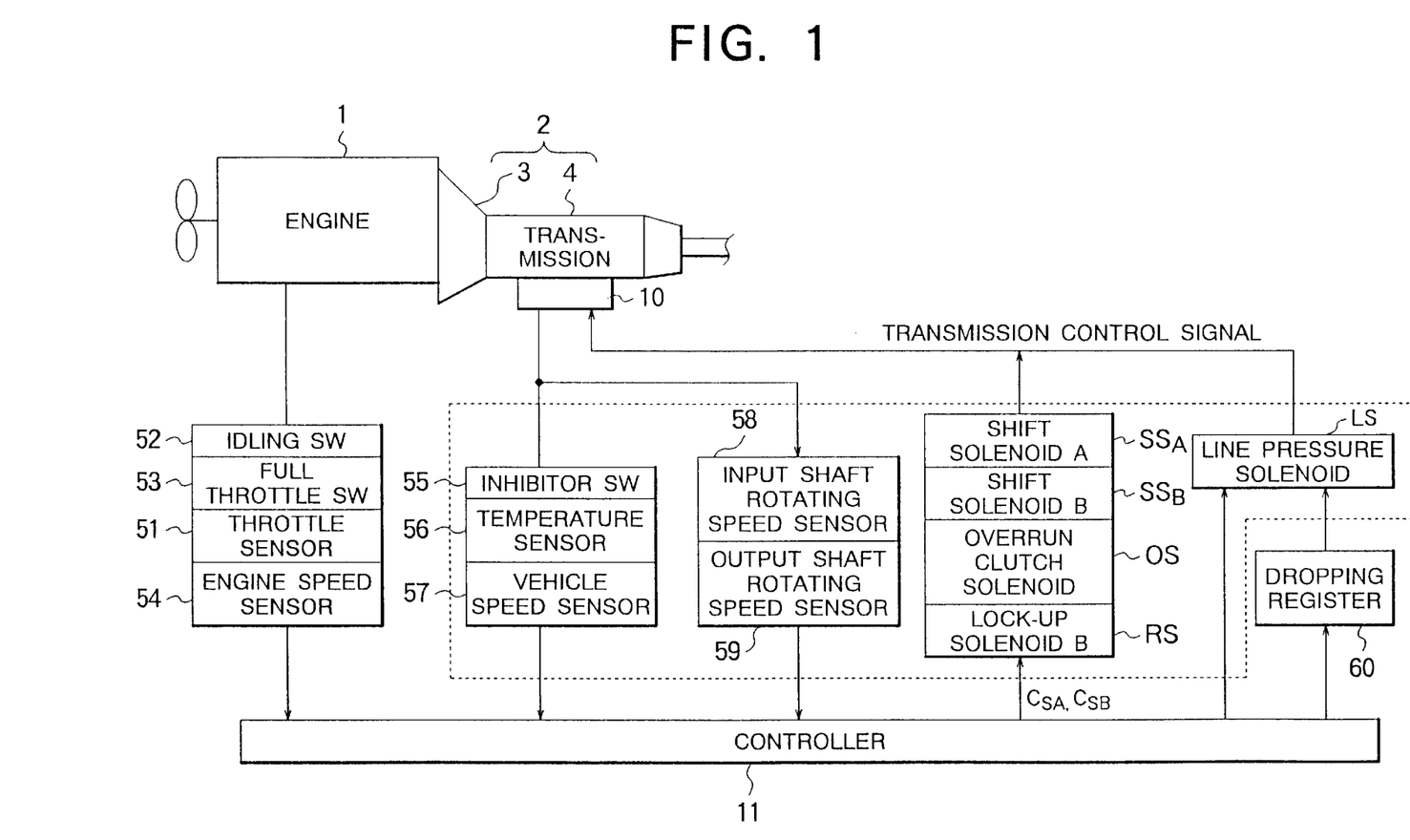
FIG. 1 is a schematic construction diagram showing an embodiment of the invention.

FIG. 1 is a schematic construction diagram showing an embodiment of the present invention in which an automatic transmission 2 connected to an output side of an engine 1 includes a torque converter 3 and a gear shift gear mechanism 4 which is connected to an output side of the torque converter 3. The output side of the automatic transmission 2 is connected to a driving wheel through a final reduction gear (not shown). The gear shift characteristic and the gear shift stage of the automatic transmission 2 are controlled by a control valve unit 10 provided at a lower side thereof.

Figure 2:
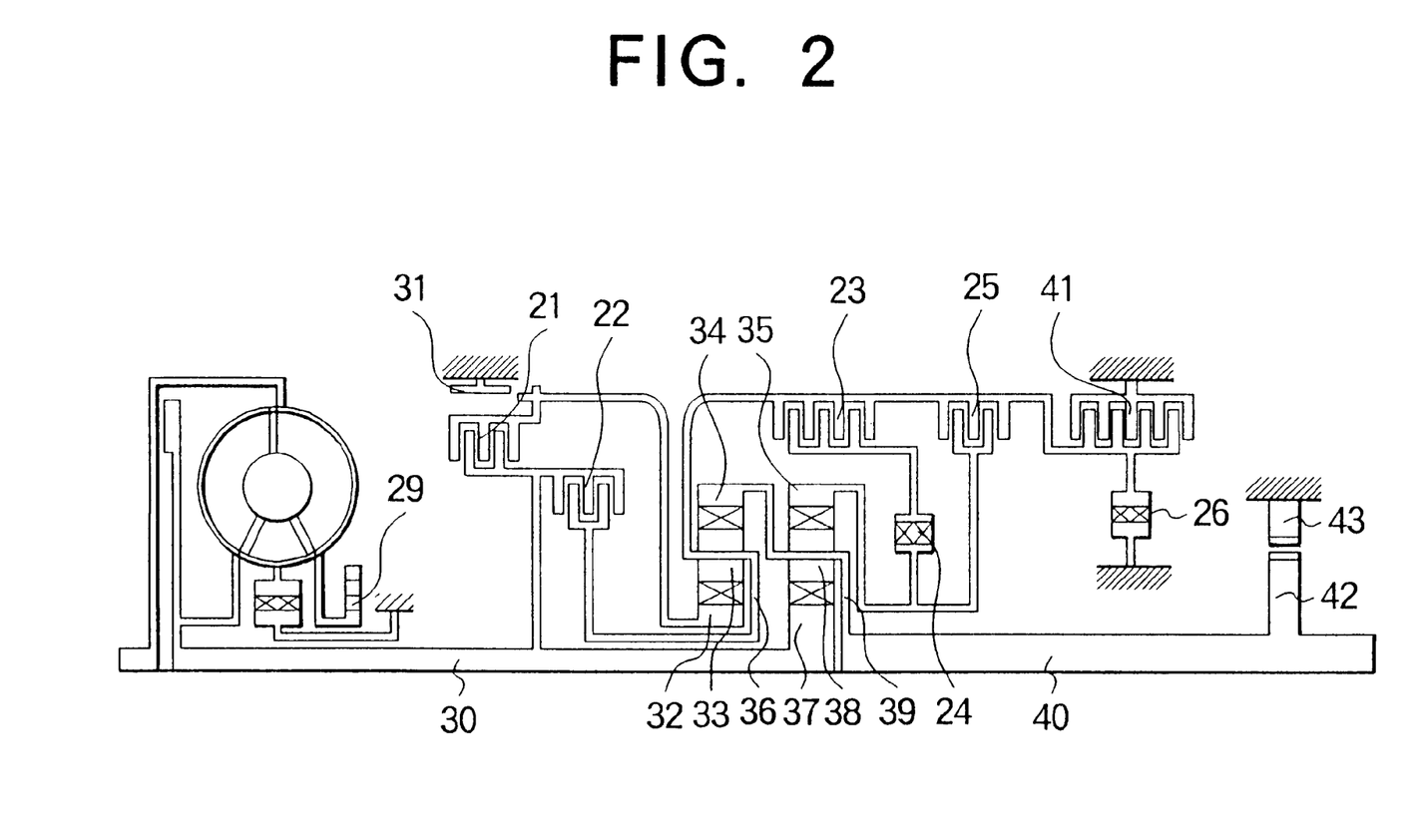
FIG. 2 is a schematic diagram showing a concrete example of a gear shift gear mechanism.

The gear shift gear mechanism 4, as shown in FIG. 2, incorporates therein various engaging elements, and in FIG. 2, the reference numeral 21 designates a reverse clutch, 22 designates a high clutch, 23 designates a forward clutch, 24 designates a forward one-way clutch, 25 designates an over clutch, 26 designates a low one-way clutch, 29 designates an oil pump, 30 designates an input shaft, 31 designates a band brake, 32 designates a front sun gear, 33 designates a front pinion, 34 designates a front internal gear, 35 designates a rear internal gear, 36 designates a front planet carrier, 37 designates a rear sun gear, 38 designates a rear pinion, 39 designates a rear planet carrier, 40 designates an output shaft, 41 designates a low and reverse brake, 42 designates a parking gear, and 43 designates a parking pole.

Figure 3:
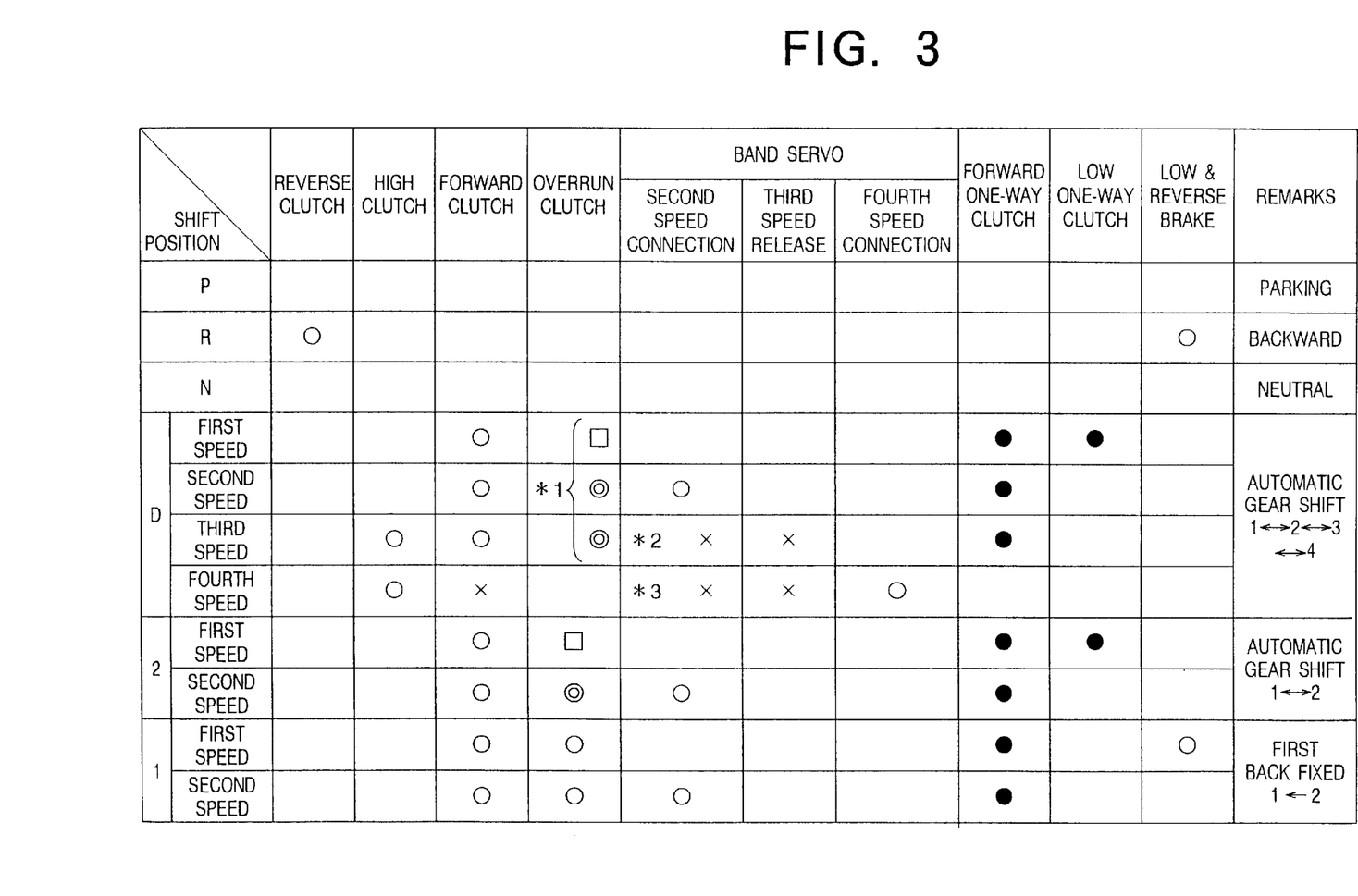
FIG. 3 is a diagram to explain an engaging operation of the gear shift gear mechanism.

The engaging elements including individual clutches 21, 22, 23, 25, and brakes 31, 41 are controlled and operated by the control valve unit 10 as shown in an engaging operation table shown in FIG. 3. In FIG. 3, the white circle ○ represents an engaging condition, the double circle ⊙ represents a condition in which it is engaged at a set accel opening degree or smaller, and engine brake is acting, the black circle ● represents a condition in which it is acting under an accelerating condition, the cross X represents a condition in which it is engaged but the engagement is not contributing to power transmission, and the white square □ represents a condition in which it is engaged at a set accel opening degree or smaller, but the engagement is not contributing to engine brake.

Furthermore, the asterisk one, *1 represents that it is operated only when the overdrive switch is turned OFF, and the asterisk two, *2 represents a condition in which the oil pressure is acting on both the second speed engaging side and the third speed release side, but since an oil pressure area is large at the release side, the brake band is not engaged, and the asterisk three, *3 represents a condition in which the brake band is engaged since the oil pressure acts on a fourth speed engagement side.

Furthermore, the gear shift stages of the automatic transmission 2 are shifted over and controlled, as shown in FIG. 1, by shift solenoids $SS_A$, $SS_B$, an overrun clutch solenoid OS, and a lock-up solenoid RS, which control each kind of control valve provided within the control valve unit 10, and by a line pressure solenoid LS which controls a line pressure within the control valve unit 10 provided at the lower side of the automatic transmission 2.

Here, the shift solenoids $SS_A$, $SS_B$ control the gear shift stages of the automatic transmission 2, that is, a gear shift point gear position corresponding to a vehicle running condition by a control signal from the controller 11 which will be described later, and the gear position moves to the first speed position when both the shift solenoids $SS_A$, $SS_B$ are in an ON condition (energized condition), and the gear position moves to the second speed position when the shift solenoid $SS_A$ is OFF condition (non-energized condition) and the shift solenoid $SS_B$ is ON condition, and the gear position moves to the third position when both the shift solenoids $SS_A$, $SS_B$ are OFF condition, and the gear position moves to the fourth position when the shift solenoid $SS_A$ is ON condition and the shift solenoid $SS_B$ is OFF condition, Furthermore, the overrun clutch solenoid OS controls the engine brake effect corresponding to a vehicle running condition by a control signal from the controller 11.

Also the lock-up solenoid RS is controlled with respect to its duty ratio by a control signal from the controller 11, thereby to control a pilot pressure supplied to a lock-up control valve to regulate a lock-up pressure.

Furthermore, the line pressure solenoid LS is controlled with respect to its duty ratio by a control signal from the controller 11, thereby to control a pilot pressure supplied to a pressure modifier valve to regulate a discharge pressure of a pump within the control valve unit 10 to a line pressure corresponding to a vehicle running condition.

Each of the solenoids SSA, SSB, OS, RS, and LS is electrically controlled by the controller 11.

The controller 11 is constituted, for example, including a microcomputer (not shown), and its input side is connected to a throttle sensor 51 for detecting an opening degree and an opening speed of a throttle valve mounted in the engine 1, an idle switch 52 for detecting, when the throttle sensor 51 is abnormal, that the throttle valve is in a fully closed condition, a full throttle switch 53 for detecting, when the throttle sensor 51 is abnormal, that the throttle valve is about ½ opening degree or larger, and an engine speed sensor 54 as engine speed detecting means for detecting an engine speed.

Furthermore, the input side of the controller 11 is connected to an inhibitor switch 55 associated with a selecting lever, an oil temperature sensor 56 for detecting a temperature of transmission oil of the automatic transmission 2, and vehicle speed sensor 57 for detecting a vehicle speed from a rotational speed of an output shaft of the automatic transmission 2.

Furthermore, the input side of the controller 11 is connected to an input shaft rotational speed sensor 58 for detecting a rotational speed of the input shaft 30 of the gear shift gear mechanism 4, and an output shaft rotational speed sensor 59 for detecting a rotational speed of the output shaft 40.

On the other hand, at an output side of the controller 11, there are connected with the above-mentioned shift solenoids $SS_A$, $SS_B$ for controlling the gear shift stage, that is, the gear position of the automatic transmission 2, the overrun solenoid OS for controlling the engine brake effect of the automatic transmission 2, the lock-up solenoid RS for controlling the lock-up pressure, and the line pressure solenoid LS. Here, a large current is directly supplied to the line pressure solenoid LS at the time of start of its needle valve, however, a small current is supplied after the start through a dropping resistor 60.

The controller 11 executes, by using the microcomputer, at least a line pressure control processing for setting a line pressure by making reference to a line pressure control map representing a relationship between a preset throttle opening degree and the line pressure, which is preset on the basis of, mainly, a throttle opening degree detection value of the throttle sensor 12, and a gear shift control processing for controlling a gear shift stage, that is, a gear position by controlling the shift solenoids $SS_A$, $SS_B$ by making reference to a gear shift characteristic control map which is preset on the basis of a vehicle speed and a throttle opening.

Next, the operation of the above embodiment will be described with reference to FIGS. 4 to 7 which show a processing procedure of the microcomputer contained in the controller 11.

Figure 4:
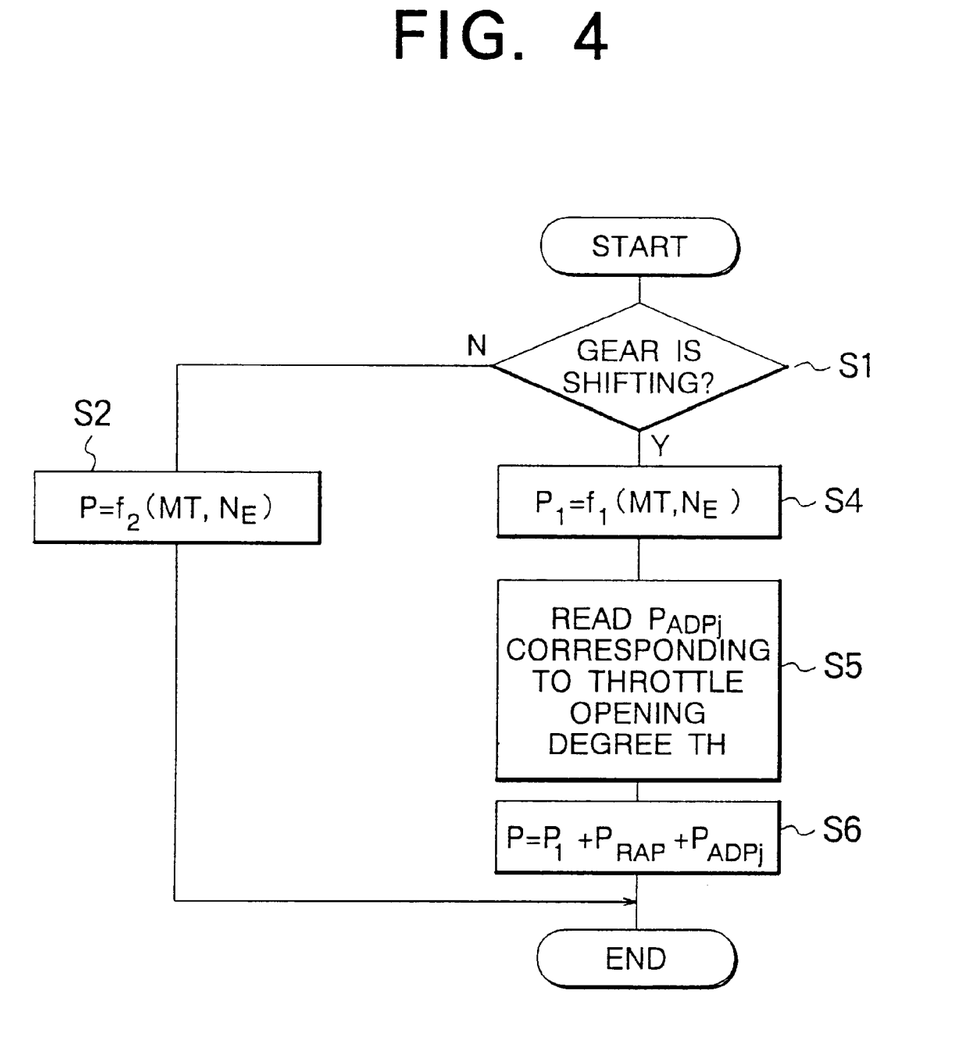
FIG. 4 is a flowchart showing an example of a gear shift control processing of a controller.

The microcomputer repeatedly executes, as a main program, a gear shift control processing of FIG. 4.

In this gear shift control processing, first, in step S1, it is determined whether a speed is changing or not. This determination is done, in a learning control processing in FIG. 7 which will be described later, by determining whether a gear shift condition flag $F_{TM}$ representing a gear shift condition is set to "1" or not, and if the gear shift condition flag $F_{TM}$ is reset to "0", it is judged that the speed is not changing, and proceeds to step S2. In step S2, a line pressure P is calculated by making reference to a gear shift control map which is preset on the basis of a turbine torque MT and an engine speed $N_E$, and a control signal having a duty ratio corresponding to the calculated line pressure is supplied to the line pressure solenoid LS.

Here the turbine torque MT is calculated, first by calculating an engine torque by making reference to a turbine torque characteristic map preset on the basis of an intake air quantity signal from an engine controller (not shown) which performs fuel injection control of the engine 1, and then by multiplying the engine torque by a torque magnification ratio calculated from a characteristic map of the torque converter 3. A first time processing is finished by calculating the turbine torque TM.

On the other hand, if the result of determination in step S1 indicates that the gear shift condition flag $F_{TM}$ is set to "1", it is judged that the speed is changing and proceeds to step S4.

In step S4, similar to step S2 mentioned above, a normal line pressure $P_1$ is calculated by making reference to a gear shift control map on the basis of the turbine torque MT and the engine speed $N_E$.

Then, proceeding to step S5, after reading a learning correction oil pressure $P_{ADPj}$ which has been set in a learning control processing of FIG. 7 described later in correspondence to a current throttle opening degree $TH_j$, proceeds to step S6. In step S6, on the basis of the normal line pressure $P_1$, a lapping correction oil pressure $P_{RAP}$ which has been set in a lapping control processing of FIG. 6 described later, and the learning correction oil pressure $P_{ADPj}$, the following equation (1) is calculated to obtain a line pressure P. A control signal having a duty ratio corresponding to the calculated line pressure P is supplied to the line pressure solenoid LS, and one time of processing is finished.

$$P = P_1 + P_{RAP} + P_{ADPj} \quad (1)$$

Furthermore, the microcomputer executes, besides the main program of FIG. 4, as a timer iterruption processing every predetermined time (for example, 10 msec), a lapping processing and a learning control processing which are a part of line pressure correction processing.

Figure 5:
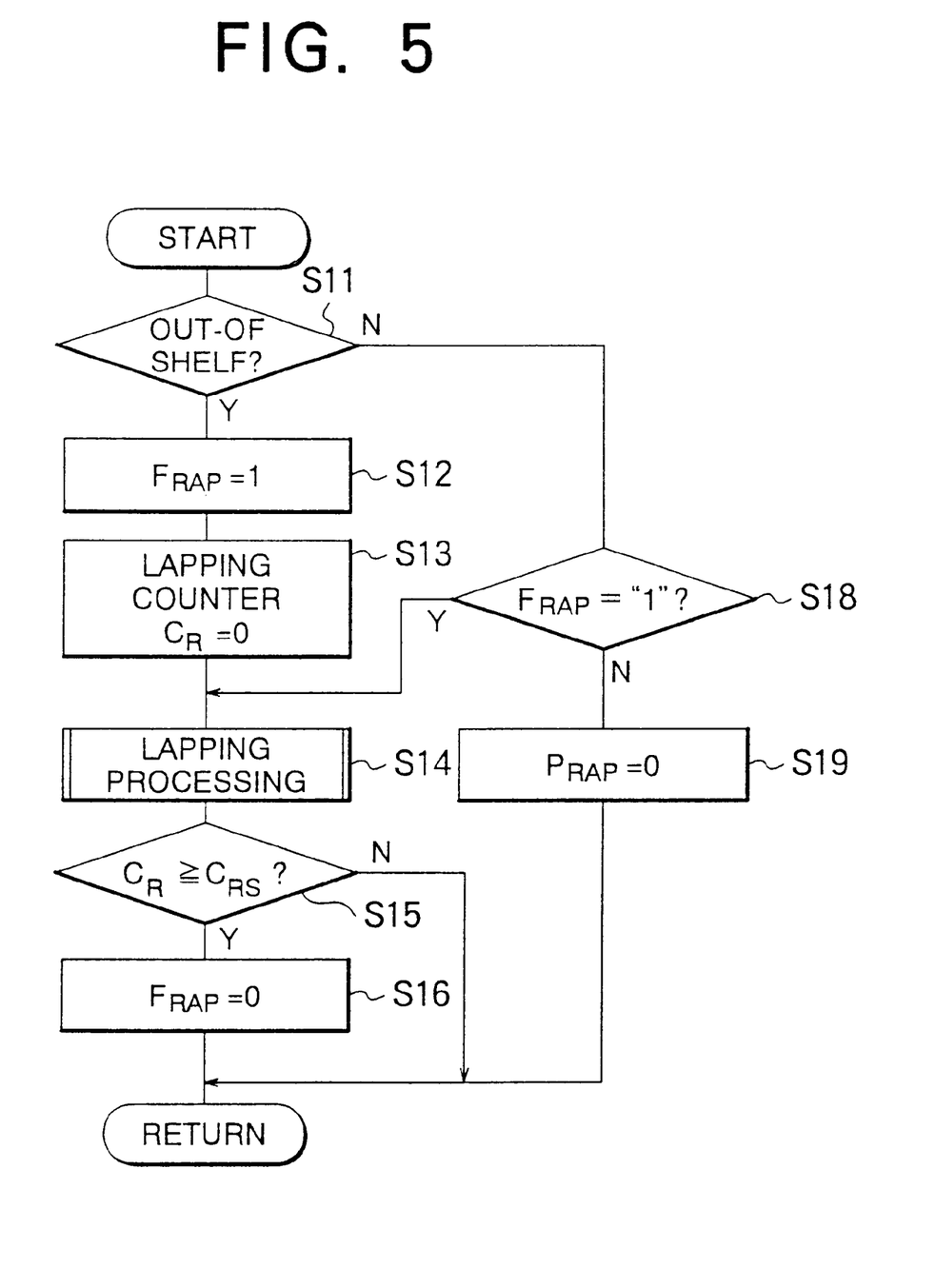
FIG. 5 is a flowchart showing an example of a line pressure control processing of a controller.

In this line pressure correction processing, as shown in FIG. 5, first, in step S11, it is determined whether an out-of shelf has occurred during the gear shift operation. Here, in the present specification, the out-of shelf means that the setting of a shelf pressure is deviated from the engaging capacity of the engaging elements. Also, the shelf pressure means a pressure having a small rising gradient as shown in FIG. 8.

Figure 8:
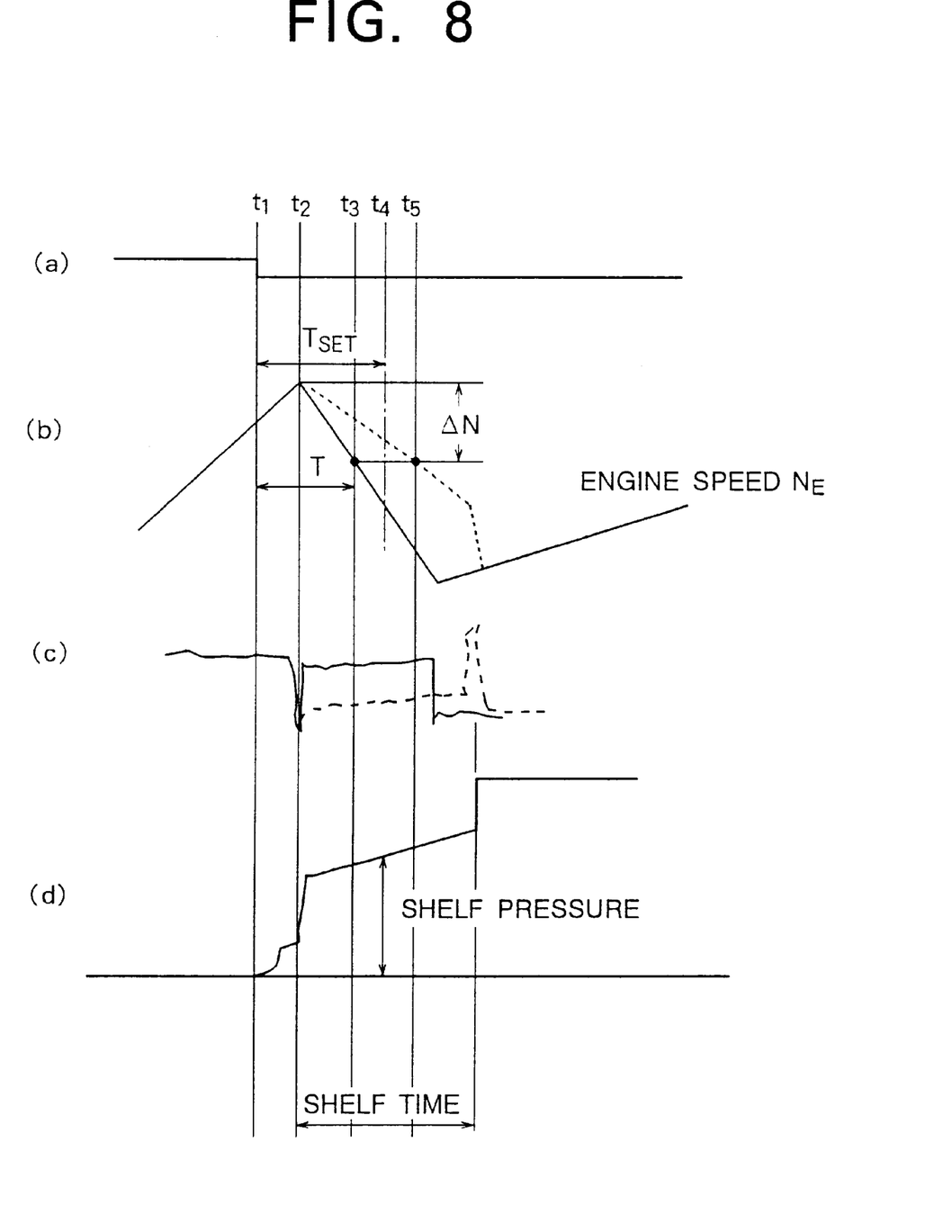
FIG. 8 is a time chart for explaining an operation to detect out-of shelf.

This determination is made by deciding whether the gear shift control during gear shift is exceeding a preset shelf time or not, and for example, as shown in FIG. 8, it is determined by monitoring the engine speed $N_E$, and by judging whether a gear shift time T from a gear shift start commanded point, that is, a time point $t_1$ at which control signals $C_{SA}$, $C_{SB}$ for starting the gear shift are supplied to the shift solenoids SSA, SSB to a time point t3 at which the engine speed $N_E$ drops by a predetermined rotational speed $N_E$ after passing through a peak is equal to or smaller than a preset time $T_{SET}$ not.

Specifically, the oil pressure required for each kind of engaging elements of the gear shift gear mechanism 4 at the time of gear shift is produced by each speed changing accumulator by controlling an accumulator control valve by controlling the duty ratio of the line pressure solenoid LS, and the oil pressure produced at this time is called as a shelf pressure of the accumulator.

In the case of a normal gear shift operation, as shown in FIG. 8, at (a), at the time point $t_1$ when the gear shift start command is issued, the shelf pressure of the accumulator begins to rise as shown in FIG. 8, at (d), and at a time point $t_2$, since the engaging elements enter an engaged condition as shown by the solid line in FIG. 8, at (c), the engine speed $N_E$ begins to decrease, and the time point $t_3$ at which engine speed $N_E$ drops from the peak by the predetermined rotational speed $N_E$ is prior to a time point $t_4$ at which the set gear shift time $T_{SET}$ elapsed from the time point $t_1$ terminates, and the output torque of the transmission returns to a high torque condition in a short time as shown in FIG. 8, at (c). However, when the line pressure supplied to the engaging elements is insufficient, the decrease of the engine speed $N_E$ becomes gradual as shown by the broken line in FIG. 8, at (b), and the time point $t_3$ at which the engine speed $N_E$ drops from the peak by the predetermined rotational speed $N_E$ will exceed the above mentioned time point t4 (i.e., exceeds the set time $T_S$), and it will be seen that the out-of shelf is caused, and at the same time, the return of the output torque of the transmission to the high torque condition is delayed as shown by the broken line in FIG. 8, at (c) so that a gear shift shock is produced.

Thus, in step S11, if the determination result indicates the occurrence of the out-of shelf, proceeds to step S12, and a lapping condition flag $F_{RAP}$ representing a lapping processing condition is set to "1" which represents that a lapping processing is being performed. Then proceeds to step S13, and a count value $C_R$ of a lapping counter is cleared to "0", and proceeds to step S14. In step S14, a lapping control processing is executed to compensate for the insufficient lapping of each kind of engaging elements of the transmission gear mechanism 4.

Subsequently, in step S15, it is determined whether the count value $C_R$ of the lapping counter reaches a set value $C_{RS}$ or larger at which set value a preset lapping processing is finished, and it $C_R \geq C_{RS}$, it is judged that the lapping processing is finished, and proceeds to step S16. In step S16, after resetting the lapping condition flag $F_{RAP}$ to "0", the timer interruption processing is finished, and if $C_R < C_{RS}$, it is judged that the lapping processing is being performed, and finishes the timer interruption processing as it is, and returns to the main program of FIG. 4.

On the other hand, in step S11, it the determination result indicates that the out-of shelf is not caused, proceeds to step S18, and determines whether the lapping condition flag $F_{RAP}$ is set to "1" or not, and if it is set to "1", proceeds to the above-mentioned step S14, and if it is reset to "0", proceeds to step S19. In step S19, the lapping correction pressure $P_{RAP}$ which is "0" is used to update and stored in a predetermined storage area of a built-in memory, and then proceeds to the above-mentioned step S17.

Figure 6:
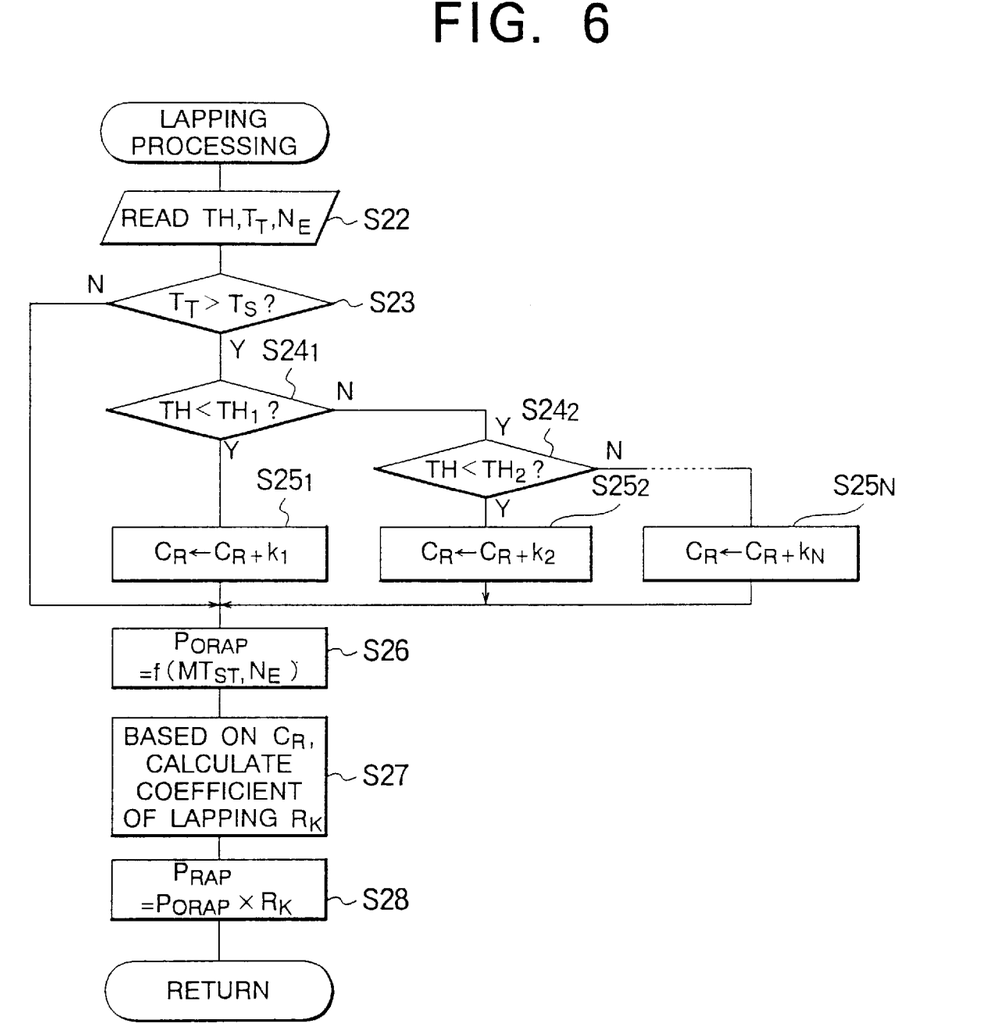
FIG. 6 is a flowchart showing a concrete example of the lapping control procedure in FIG. 5.

Here, in a concrete example of the lapping control processing of FIG. 5, as shown in FIG. 6, first, in step S22, a throttle opening degree TH of the throttle sensor 51, a transmission oil temperature $T_T$ of the temperature sensor 56, and an engine speed $N_E$ of the engine speed sensor 54 are read, and proceeds to step S23. In step S23, it is determined whether the transmission oil temperature $T_T$ exceeds a preset temperature $T_S$ or not, and if $T \leq T_S$, it is judged that the lapping of each kind of friction elements is not progressed, that is, the coefficient of friction is not high, and proceeds to step S26 described later.

On the other hand, in step S23, if the determination result indicates $T_T > T_S$, it is judged that the lapping of the gear shift gear mechanism 4 is progressed, that is, the coefficient of friction is high, and proceeds to step $S24_1$, and determines whether or not the throttle opening degree TH is less than a minimum boundary opening degree TH1 among boundary opening degrees from a boundary opening degree $TH_1$ to a maximum opening degree $TH_{N-1}$ obtained when a range of throttle opening degree from fully closed to fully opened is divided equally by N (positive integer), and if $TH < TH_1$, proceeds to step $S25_1$. In step $S25_1$, the current count value $C_R$ of the lapping counter is added with a gear shift load value $k_1$ preset by experiment to obtain a new count value $C_R$. This is used to update and is stored in a predetermined storage area of the built-in memory, and then proceeds to step S26. In step $S24_1$, if $TH \geq TH_1$, proceeds to step $S24_2$, and it is determined whether the throttle opening degree TH is less than a second boundary opening degree $TH_2$ or not, and if $TH < TH_2$, proceeds to step $S25_2$, and the current count value $C_R$ of the lapping counter is added with a gear shift load value $k_2$ preset by experiment to obtain a new count value $C_R$. This is used to update and is stored in a predetermined storage area of the built-in memory, and then proceeds to step S26. In step $S24_2$, if $TH \geq TH_2$, thereafter, sequentially, the the throttle opening degree TH is compared with a third boundary opening degree $TH_3$ to N-1 th boundary opening degree $TH_{N-1}$, and if the throttle opening degree TH is less than the compared boundary opening degree, the current count value $C_R$ is added with a gear shift load value $k_i$ to obtain a new count value $C_R$. This is used to update and is stored in a predetermined storage area of the built-in memory, and then proceeds to step S26. If the throttle opening degree TH is equal to or larger than the last boundary opening degree $TH_{N-1}$, proceeds to step $25_N$, and the current count value $C_R$ of the lapping counter is added with a gear shift load value $k_N$ preset by experiment to obtain a new count value $C_R$. This is used to update and is stored in a predetermined storage area of the built-in memory, and then proceeds to step S26.

Figure 9:
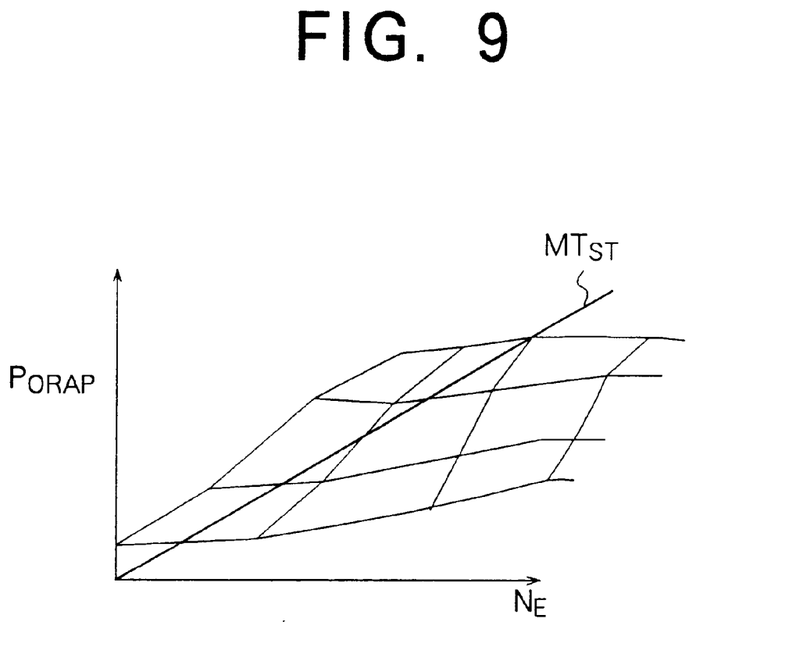
FIG. 9 is a characteristic diagram showing a lapping oil pressure calculating map used in the lapping control procedure.

In step S26, a lapping reference oil pressure $P_{ORAP}$ is calculated by making reference to a lapping oil pressure calculating map shown in FIG. 9, on the basis of a turbine torque $MT_{ST}$ at the time of start of gear shift and an engine speed $N_E$, and then proceeds to step S27.

Figure 10:
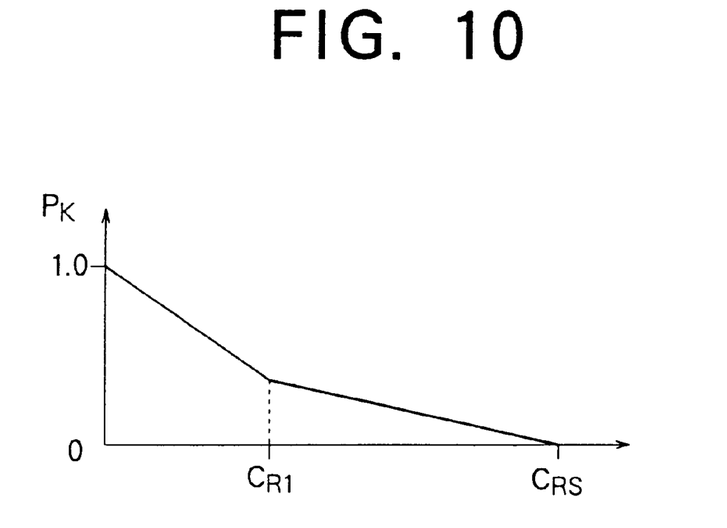
FIG. 10 is a characteristic diagram showing a lapping oil pressure coefficient calculating map used in the lapping control procedure.

In this step S27, a count value $C_R$ of the lapping counter stored in a predetermined storage area is read, and a lapping oil pressure coefficient $R_K$ is calculated by making reference to a lapping oil pressure coefficient calculating map shown in FIG. 10, on the basis of the read out count value $C_R$.

Here, in the lapping oil pressure coefficient calculating map, the lapping oil pressure coefficient $R_K$ is set to "1", when the count value $C_R$ is "0", and thereafter, as the count value $C_R$ is increased, the lapping oil pressure coefficient $R_K$ is reduced with a relatively steep gradient. When the count value $C_R$ reaches a preset value $C_{R1}$, thereafter, the lapping oil pressure coefficient $R_K$ is reduced with a relatively slow gradient, and after the count value $C_R$ reaches a preset value CRS, the lapping oil pressure coefficient $R_K$ becomes "0".

Subsequently, in step S28, a lapping correction oil pressure $P_{RAP}$ is calculated by calculating the following equation (2) on the basis of the lapping reference oil pressure $P_{ORAP}$ and the lapping oil pressure coefficient $R_K$. Thereafter, the lapping control processing is finished, and proceeds to the process of step S15 in FIG. 5.

$$P_{RAP} = P_{ORAP} \times R_K \tag{2}$$

Figure 7:
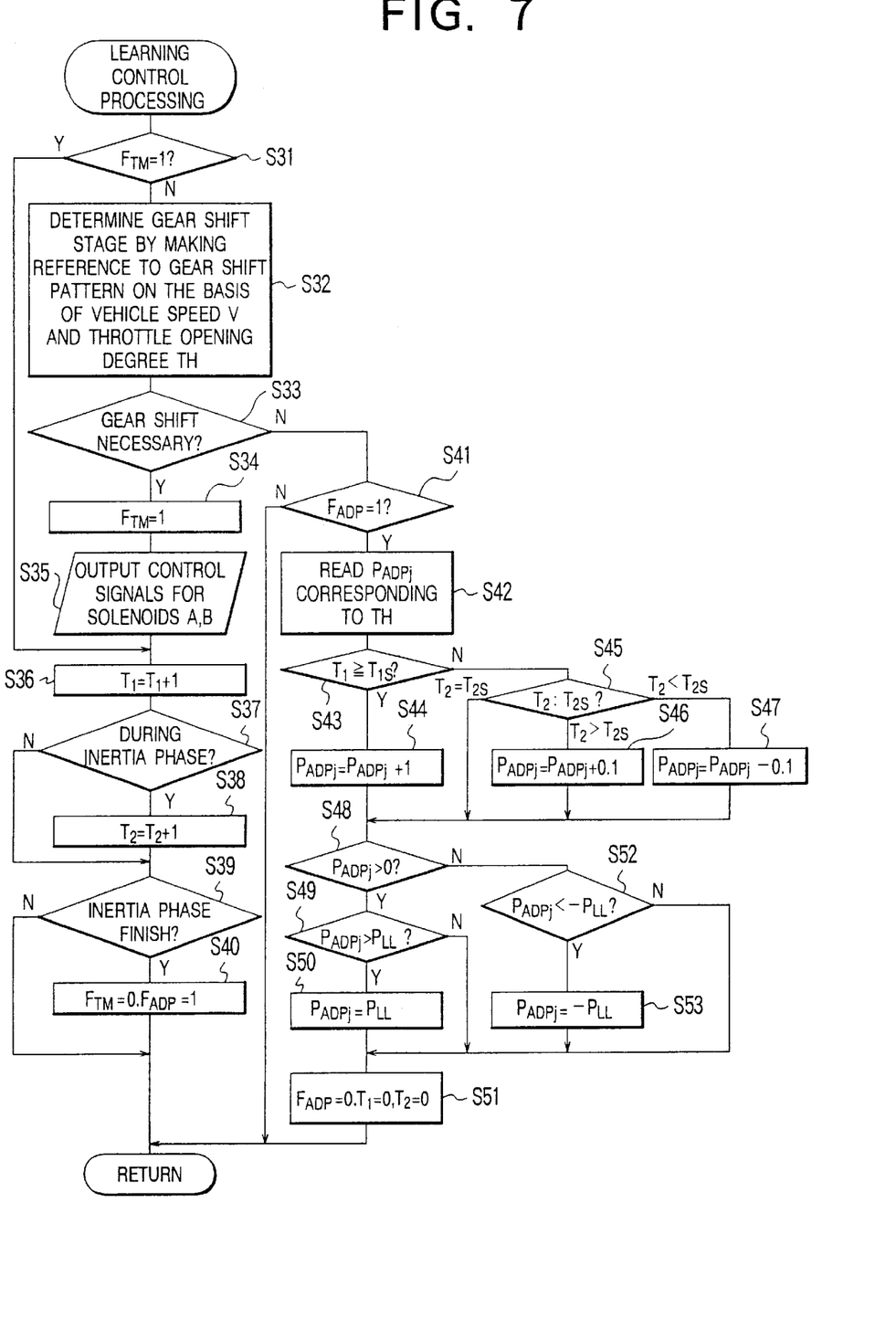
FIG. 7 is a flowchart showing a concrete example of the learning control procedure in FIG. 5.

Furthermore, in the learning control processing, as shown in FIG. 7, first, in step S31, it is determined whether a gear shift condition flag $F_{TM}$ representing that the gear shift is being performed is set to "1" or not, and if it is reset to "0", it is judged that the gear shift is not being performed, and proceeds to step S32. In step S32, a required gear shift stage is determined by making reference to a gear shift pattern which is preset on the basis of a vehicle speed detection value V of the vehicle sensor 57 and a throttle opening degree TH of the throttle sensor 51.

Subsequently, in step S33, it is determined whether a gear shift is necessary or not based on whether the required gear shift stage is different from the presently selected gear shift stage or not. If the required gear shift stage is different from the present gear shift stage, it is judged that the gear shift is necessary, and proceeds to step S34. In step S34, the gear shift condition flag $F_{TM}$ is set to "1", and proceeds to step S35 wherein control signals $C_{SA}$, $C_{SB}$ to the shift solenoids $SS_A$, $SS_B$ are outputted, and then proceeds to step S36.

In step S36, a count value $T_1$ representing an elapsed time from the start of gear shift is incremented by "1", and then proceeds to step S37, and determines whether it is in an inertia phase wherein a gear ratio $(N_1/N_0)$ represented by a ratio of an input shaft rotational speed $N_1$ of the input shaft rotational speed sensor 58 to an output shaft rotational speed $N_0$ of the input shaft rotational speed sensor 59 is changing. If it is determined that it is in the inertia phase, proceeds to step S38, and increments a count value $T_2$ representing an elapsed time of the inertia phase by "1", and proceeds to step S39, whereas if it is not in the inertia phase, proceeds directly to step S39.

In step S39, determines whether it is in an inertia phase finished condition wherein the gear ratio $(N_1/N_0)$ becomes a constant value, and if the inertia phase is finished, proceeds to step S40, and resets the gear shift condition flag $F_{TM}$ to "0", and at the same time, sets a learning control flag $F_{ADP}$ representing a learning condition to "1", thereby to finish the processing.

On the other hand, if the determination result in step S33 indicates that the required gear shift stage coincides with the current gear shift stage, and the gear shift is not necessary, proceeds to step S41, and determines whether the learning control flag $F_{ADP}$ is set to "1" or not. If it is reset to "0", the learning control processing is finished as it is, and if it is set to "1", proceeds to step S42.

In step S42, a learning correction oil pressure $P_{ADP}$ corresponding to the current throttle opening degree $TH_j$ stored in a predetermined storage area of the built-in memory is read, and proceeds to step S43, and determines whether the gear shift time count value $T_1$ is equal to or larger than a preset value $T_{1S}$. This determination determines whether or not the duty ratio of the duty control output to the line pressure solenoid LS is small so that the engaging oil pressure to each kind of engaging elements of the transmission gear mechanism 4 becomes small, and hence the gear shift time becomes long thereby to cause the out-of shelf condition.

Figure 11:
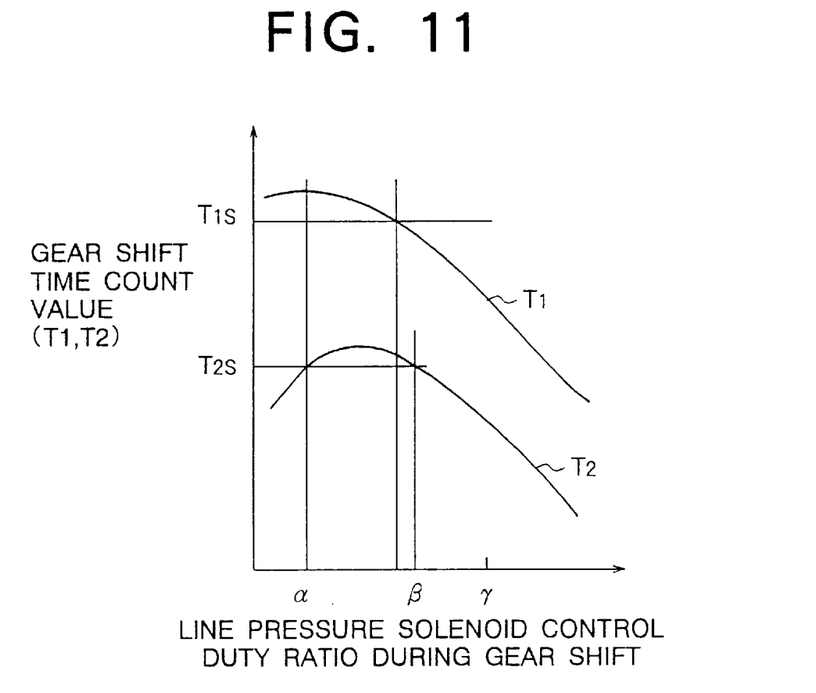
FIG. 11 is a characteristic diagram showing a relationship between a duty ratio of a control signal to a line pressure solenoid during gear shift and a gear shift time.

Here, in a normal automatic transmission, a relationship between the duty ratio $(P_1 + P_{ADP})$ of the control signal to control the line pressure solenoid LS at the time of gear shift and a count values $T_1$ and $T_2$ of the gear shift time is as shown in FIG. 11. Specifically, when the duty ratio is relatively a small value $\alpha$, the count value $T_1$ representing a gear shift elapsed time becomes equal to or larger than a set value $T_{1S}$, and the count value $T_2$ representing an inertia elapsed time approximately coincides with a target value $T_{2S}$. When the duty ratio is a medium value $\beta$, the count value $T_1$ is less than the set value $T_{1S}$, and the count value T2 approximately coincides with a target value T2S. When the duty ratio is a large value 7 the count value $T_1$ is less than the set value $T_{1S}$, and the count value $T_2$ is less than the target value $T_{2S}$.

Accordingly, if the determination result in step S43 indicates that $T_1 \geq T_{1S}$, it is judged that the duty ratio of the control signal to control the line pressure solenoid LS is too small so that the gear shift time becomes long, and proceeds to step S44. In step S44, a learning correction oil pressure $P_{ADPj}$ corresponding to the current throttle opening degree $TH_j$ is added with, for example "1" to obtain a new learning correction oil pressure $P_{ADPj}$, and this is used to update and is stored in a predetermined storage area of the built-in memory.

If the determination result in step S43 indicates that $T_1<T_{1S}$, it is judged that the duty ratio of the control signal to control the line pressure solenoid LS is large, and proceeds to step S45. In step S45, the count value $T_2$ representing an inertia phase elapsed time is compared with the target value $T_{2S}$, and if $T_2=T_{2S}$, it is judged that the inertia phase elapsed time coincides with the target time, and proceeds to step S 48, and if $T_2>T_{2S}$, it is judged that the inertia phase elapsed time is longer than the target time, and proceeds to step S46. In step S46, the learning correction oil pressure $P_{ADPj}$ corresponding to the current throttle opening degree $TH_j$ is added with, for example, "0.1" to obtain a new learning correction oil pressure PADPj. This is used to update and is stored in a predetermined storage area, and proceeds to step S48. Furthermore, if $T_2<T_{2S}$, it is judged that the inertia phase elapsed time is shorter than the target time, and proceeds to step S47. In step S47, the learning correction oil pressure $P_{ADPj}$ corresponding to the current throttle opening degree $TH_j$ is reduced by subtracting therefrom, for example, "0.1" to obtain a new learning correction oil pressure $P_{ADPj}$. This is used to update and is stored in a predetermined storage area, and proceeds to step S48.

In step S48, it is determined whether the learning correction oil pressure $P_{ADPj}$ is positive or not, and if it is positive, proceeds to step S49, and determines whether the learning correction oil pressure $P_{ADPj}$ exceeds an upper limit value $P_{UL}$ set in advance, and if it exceeds the upper limit value $P_{UL}$, proceeds to step S50. In step S50, the the upper limit value PUL is used as the learning correction oil pressure $P_{ADPj}$, and is stored in a predetermined storage area, and proceeds to step S51. In step S51, the learning control flag $F_{ADP}$ is reset to "0", and at the same time, the count values T1 and T2 are cleared to "0", and the learning control processing is finished.

On the other hand, in step S48, if the determination result indicates that the learning correction oil pressure $P_{ADPj}$ is negative or "0", proceeds to step S52. In step S52, it is determined whether the learning correction oil pressure $P_{ADPj}$ is smaller than a lower limit value $-P_{LL}$ whose absolute value is smaller than the above-mentioned upper limit value P set in advance, and if $P_{ADPj}<-P_{LL}$, proceeds to step S53, and the lower limit value $-P_{LL}$ is used to update and is stored as the learning correction oil pressure $P_{ADPj}$ in a predetermined storage area, and proceeds to step S51. In step S52, if $P_{ADPj} \geq -P_{LL}$, proceeds to step S51 as it is.

The processing of FIG. 4 corresponds to gear shift control means, the step S11 in the processing of FIG. 5 corresponds to out-of shelf detection means, the processing in steps S12 to S16, and S18, S19 and the processing of FIG. 6 corresponds to first engaging oil pressure setting means, and the processing in step S17 and the processing of FIG. 7 corresponds to second engaging oil pressure setting means.

Accordingly, now, supposing that both the automatic transmission 2 and the controller 11 are brand-new, and it is the time to deliver from a factory, at the time of starting a running test at their final line, they are in an initial condition, and all of the lapping correction oil pressure $P_{RAP}$ and the learning correction oil pressure $P_{ADPj}$ have been cleared to "0". Thus, when the processing of FIG. 4 is executed, and gear shift is started, the line pressure P is only the normal line pressure $P_1$, and a control signal of a duty ratio corresponding to the normal line pressure $P_1$ is supplied to the line pressure solenoid LS, so that the line pressure is controlled to a value at which the friction elements have been adapted to each other and the insufficiency of lapping has been resolved.

At this time, since the automatic transmission 2 is brand-new, the coefficient of friction of each friction elements is small and in a lapping insufficient condition. Thus, when the gear shift of the first time is started, in the gear shift control processing of FIG. 5, the out-of shelf will be detected.

Figure 12:
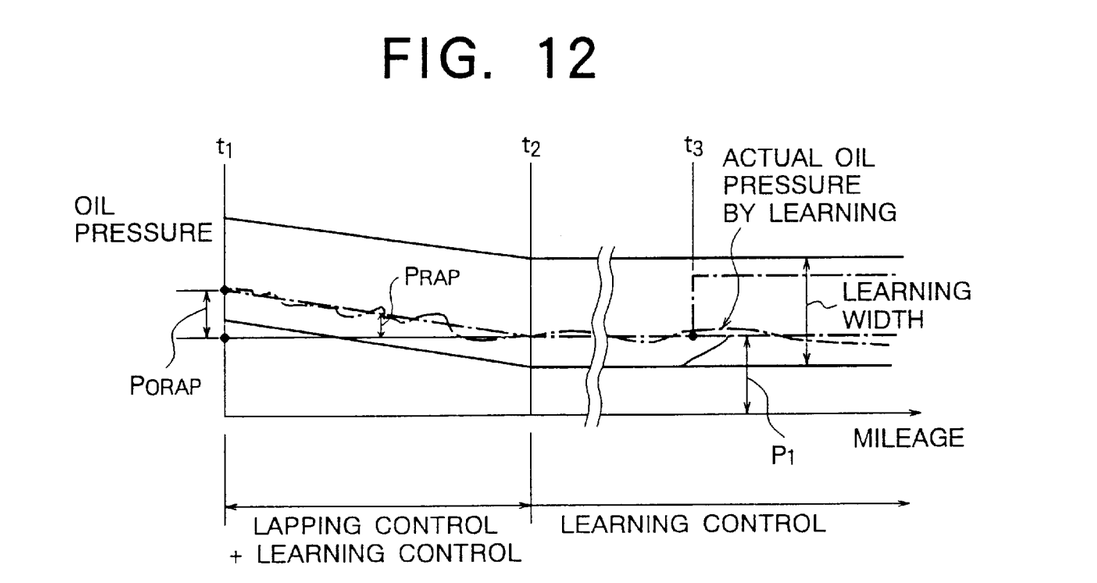
FIG. 12 is a time chart for explaining an operation of an embodiment of the present invention.

As a result, the lapping condition flag $F_{RAP}$ is set to "1", and also the count value $C_R$ of the lapping counter is cleared to "0". Hence, the lapping processing of FIG. 6 is started, and when the transmission oil temperature $T_T$ is equal to or lower than the set temperature $T_S$, the count value $C_R$ of the lapping counter is not increased, and the condition in which the count value $C_R$ is cleared to "0" is maintained. Thus, the lapping oil pressure coefficient $R_K$ becomes "1" as shown in FIG. 10, and the lapping reference oil pressure $P_{ORAP}$ calculated from the turbine torque $MT_{ST}$ and the engine speed $N_E$ at the time of start of gear shift is calculated as it is as the lapping correction oil pressure $P_{RAP}$, and this is used to update and is stored in a predetermined storage area. Accordingly, when the processing of step S6 of FIG. 4 is executed subsequently, as shown in FIG. 12, the line pressure P is a higher pressure with respect to the normal line pressure $P_1$ by the lapping correction oil pressure $P_{RAP}$, and a control signal of a duty ratio corresponding to this line pressure P is supplied to the line pressure solenoid LS so that the line pressure supplied to each kind of engaging elements is raised to suppress the reduction of the friction coefficient due to insufficient lapping.

At the same time, since the learning control processing shown in FIG. 7 is executed, the count value $T_1$ corresponding to the gear shift time becomes equal to or larger than the set value $T_{1S}$.

Accordingly, when the first time of gear shift operation is finished, in the learning control processing of FIG. 7, the process proceeds from step S33 to step S44 via steps S41 to step S43, and the learning correction oil pressure $P_{ADPj}$ corresponding to the throttle opening degree $TH_j$ is added by "1", and this is used to update and is stored as a new learning correction oil pressure $P_{ADPj}$.

Therefore, when the process proceeds to the next gear shift operation while maintaining the accel opening degree TH constant, the lapping correction oil pressure $P_{RAP}$ and the added learning correction oil pressure $P_{ADPj}$ are added to the normal line pressure $P_1$. As a result, the line pressure P becomes a large value, and the tight engaging condition of the engaging elements of the gear shift gear mechanism 4 is ensured, and it is possible to prevent the occurrence of the elongation of the gear shift time and the gear shift shock reliably.

Furthermore, when the throttle opening degree TH at the time of gear shift of the second time differs from the throttle opening degree of the previous time, since the learning correction oil pressure is not set to that throttle opening degree TH, the correction of the line pressure by the learning control is not performed.

In this gear shift control of this second time, since the line pressure for each kind of engaging elements has been increased, the out-of shelf is not caused. However, since the count value $C_R$ of the lapping counter is small value and does not reach the set value $C_{RS}$, the lapping condition flag $F_{RAP}$ is never reset to "0", and when the processing of FIG. 5 is executed, the process proceeds to step S18 from the step S11. However, since the lapping condition flag $F_{RAP}$ has been set to "1", the process proceeds to step S14, and the lapping control processing of FIG. 6 is continued.

At this time supposing that the transmission oil temperature $T_T$ is equal to or higher than the set temperature $T_S$, the process proceeds to step S24$_1$ from step S23, and a gear shift load value $K_j$ corresponding to the throttle opening degree $TH_j$ at this time is added to the count value $C_R$ of the lapping counter thereby to calculate a new count value $C_R$, and this value is used to update and is stored in a predetermined storage area.

Accordingly, since the value of the lapping oil pressure coefficient $R_K$ calculated in response to the increase in the count value $C_R$ in step S27 becomes a smaller value than "1", the value of the lapping correction oil pressure $P_{RAP}$ calculated in step S28 also becomes a small value, and hence the line pressure supplied to each kind of engaging elements of the transmission gear mechanism 4 becomes small as the degree of adaptation of the engaging elements is increased with time.

Thereafter, the lapping correction oil pressure $P_{RAP}$ becomes sequentially small as the count value $C_R$ increases, and when the number of times of the gear shift reaches about 200 times at a time point $t_2$, and the count value $C_R$ of the lapping counter reaches the set value CRS, the lapping oil pressure coefficient $R_K$ becomes "0". Thus, the lapping correction oil pressure $P_{RAP}$ becomes zero, and in the processing of FIG. 5, the process proceeds to step S16 through step S15, and the lapping condition flag $F_{RAP}$ is reset to "0", and the lapping control processing is finished. Thereafter, only the learning control processing of FIG. 7 is executed, and an appropriate line pressure is ensured by dealing with the non-uniformity of the friction coefficients due to the non-uniformity of each kind of engaging elements of the gear shift gear mechanism 4, and satisfactory gear shift control can be performed.

As described above, after each kind of engaging elements of the gear shift gear mechanism 4 of the automatic transmission 2 is adapted and the insufficient lapping is resolved, and after the processing proceeds to the normal control condition, when an abnormality or failure occurs and the automatic transmission 2 is replaced by a brand-new one at a time point $t_3$ in FIG. 12, since the lapping control processing of FIG. 6 has been finished at this time point $t_3$, the line pressure P is set by only the normal line pressure $P_1$ and the learning correction oil pressure $P_{ADPj}$. As a result, similar to the above-mentioned case at the time point $t_1$ where both the automatic transmission 2 and the controller 11 are brand-new, the out-of shelf of the shelf pressure will be detected, and thus, the lapping control processing of FIG. 6 will be executed again. Thus, the line pressure P will be increased as shown by a long and short dash line in FIG. 12, and it is possible to prevent the elongation of the gear shift time and the gear shift shock from occurring.

Furthermore, after the lapping control processing is finished, when an abnormality occurs and the controller 11 is replaced by a brand-new one, since in the controller 11, both the lapping correction oil pressure $P_{RAP}$ and the learning correction oil pressure $P_{ADPj}$ are initialized to "0", variations of line pressure P corresponding to the learning correction oil pressure $P_{ADPj}$ of the controller before the replacement will be caused. However, when the learning correction oil pressure $P_{ADPj}$ before the replacement is negative, the out-of shelf of the shelf pressure will not be caused because the learning correction oil pressure $P_{ADPj}$ of the brand-new controller is higher. Furthermore, even in the case where the learning correction oil pressure $P_{ADPj}$ before the replacement is positive and a difference is large, since the learning correction oil pressure PADPj is increased to a great extent in step S44 when the processing of FIG. 7 is executed, the difference between the old and new learning correction oil pressures will be reduced as the time elapses.

In the case where the correction is insufficient, and the out-of shelf is caused even by the above-mentioned learning control processing, the lapping control processing of FIG. 6 will be executed, and the occurrence of the elongation of the gear shift time and the gear shift shock will be prevented.

Similarly, after the lapping control processing is finished, even when the controller 11 is replaced by a used controller, or the automatic transmission is replaced by a used or rebuilt automatic transmission, by executing the processings of FIGS. 4 to 7 by this used controller, the normal learning control processing is executed. As a result, an appropriate line pressure is ensured, and at the same time, the lapping control processing is executed when the out-of shelf is detected, and the occurrence of the elongation of the gear shift time and the gear shift shock will be prevented.

Furthermore, in the case where an abnormality occurs in the control system including the line pressure solenoid LS at a time point t3 in FIG. 12, and the out-of shelf occurs due to a decrease in the line pressure supplied to each kind of engaging elements of the gear shift gear mechanism 4, the lapping control processing is executed instantly at the time point of detection of this out-of shelf, and the line pressure P is increased. In correspondence to this increase, since the duty ratio of the control signal to the line pressure solenoid LS is increased, it is possible to compensate for the decrease in the oil pressure to each kind of engaging elements. Thereafter, although the lapping correction oil pressure $P_{RAP}$ in the lapping control processing is decreased gradually, this decrease is compensated for by an increased in the learning correction oil pressure $P_{ADPj}$ in the learning control processing. Thus, the decrease in the oil pressure due to the abnormality in the control system can be compensated for near the upper limit of a learning width, and the line pressure can be ensured even at the time of occurrence of the abnormality.

In this manner, in the embodiment mentioned above, even when the automatic transmission 2 and/or the controller 11 are replaced, the out-of shelf is monitored at the controller 11 side, and the lapping control processing is instantly executed upon detecting the out-of shelf so that the line pressure to each kind of engaging elements is increased, thereby to prevent the occurrence of the elongation of the gear shift time and the gear shift shock.

In addition, different from the case where a different learning correction oil pressure is set for each throttle opening degree as in the learning control processing, since the lapping control processing is executed independent of the throttle opening degree, it is executed certainly when the out-of shelf occurs, and it is possible thereafter to reliably prevent the occurrence of the elongation of the gear shift time and the gear shift shock.

Furthermore, since the learning control processing is always executed, it is possible to reliably maintain the line pressure of each kind of engaging elements in correspondence to the friction coefficient change of the engaging elements or the like and the deterioration with age of the control system. As a result, it is possible to prevent the occurrence of the gear shift shock and the decrease in the service life of the friction elements.

In the above embodiment, it is described as to the case where the out-of shelf is detected depending on whether the time elapsed until the engine speed $N_E$ is decreased by $\Delta N$ is larger than a set value or not. However, the invention is not limited to this, but the out-of shelf may be detected depending on whether a time elapsed until the gear ratio represented by the ratio of the input shaft rotational speed $N_I$ to the output shaft rotational speed $N_O$ is shifted to an arbitrary value, is equal to or larger than a set value or not. In other wards, it will be sufficient if it is possible to judge whether the proceeding condition of the gear shift is normal or not.

Also, in the above embodiment, it is described as to the case where in the lapping control processing, the lapping oil pressure coefficient RK is continually decreased in accordance with the increase of the count value $C_R$. However, the invention is not limited to this, but the lapping oil pressure coefficient $R_K$ may be decreased sequentially stepwisely. Furthermore, the number of the steps may be two steps, and the lapping count value $C_R$ may be shifted over between "1" and "0" before and after a predetermined value.

The present invention offers the following advantages.

In accordance with the above-mentioned first aspect of the invention, in the case of performing the gear shift by the gear shift gear mechanism, it is judged whether the engaging elements are adapted to each other on the basis of the accumulated value of the gear shift load applied to the engaging elements at that time, and if the accumulated value is equal to or smaller than the predetermined value, it is judged that the engaging elements are not adapted to each other, and the engaging oil pressure at the time of gear shift is made higher than the case where the accumulated value is equal to or higher than the predetermined value thereby to suppress a variation of the gear shift time due to the insufficient lapping. If the out-of shelf is detected by the out-of shelf detecting means, the accumulated value of the gear shift load is shifted to a smaller value thereby to enable to start the lapping control. Furthermore, it is possible to detect the replacement of one of the automatic transmission and the controller at the controller side depending on whether the out-of shelf occurs or not, and an appropriate gear shift time control is performed in accordance with the detection so that the occurrence of the elongation of the gear shift time and the gear shift shock are prevented.

I claim:

1. In an automatic transmission wherein an engaging oil pressure for each of different kinds of friction elements of a gear shift gear mechanism is adjusted by an engaging oil pressure adjusting unit, and the friction elements are selectively operated to select a predetermined gear shift stage, a gearshift time automatic adjusting apparatus comprising:

an out-of shelf detecting unit that detects whether or not a gear shift time is in an out-of shelf condition indicating that the gear shift time exceeds a preset shelf-time;

a first engaging oil pressure setting unit that sets a first engaging oil pressure correction value, the first engaging oil pressure setting unit increasing the engaging oil pressure for the engaging oil pressure adjusting unit to prevent the out-of shelf condition from occurring; and a gear shift control unit that controls the engaging oil pressure adjusting unit on a basis of the engaging oil pressure set by the first engaging oil pressure setting unit;

wherein said first engaging oil pressure setting unit includes a gear shift load detecting unit that detects a gear shift load applied to the engaging elements, and a gear shift load accumulating unit that accumulates the gear shift load detected by the gear shift load detecting unit, and when an accumulated value of the gear shift load accumulating unit is lower than a predetermined value, said first engaging oil pressure setting unit sets the first engaging oil pressure correction value to increase the engaging oil pressure at the time of gear shift so that the first engaging oil correction value becomes higher than in the case where the accumulated value is equal to or larger than the predetermined value, and the gear shift load accumulating unit reduces the accumulated value when the out-of shelf detecting unit detects the out-of shelf condition.

2. A gear shift time automatic adjusting apparatus according to claim 1, further comprising a gear ratio change detection unit that detects whether or not the gear ratio in the gear shift gear mechanism is changing, an inertia phase time measuring unit that measures an elapsed time of the gear change, when the gear ratio change detection unit detects that the gear ratio is changing, a second engaging oil pressure setting unit that sets a second engaging oil pressure correction value of the engaging oil pressure adjusting unit so that the measured elapsed time of the inertia phase time measuring unit becomes equal to a target value, and the gear shift control unit controls the engaging oil pressure adjusting unit on the basis of the engaging oil pressures set by the first engaging oil pressure setting unit and the second engaging oil pressure setting unit.

3. A gear shift time automatic adjusting apparatus according to claim 1, wherein when the out-of shelf condition is detected by the out-of shelf detecting unit, said gear shift load accumulating unit sets the accumulated value to an initial value.

4. A gear shift time automatic adjusting apparatus according to claim 1, wherein said first engaging oil pressure setting unit reduces the first engaging oil pressure correction value as the accumulated value of the gear shift load accumulating unit becomes larger.

5. A gear shift time automatic adjusting apparatus according to claim 1, wherein said gear shift load detection unit comprises a throttle opening degree detecting unit that detects a throttle opening degree, and said gear shift load accumulating unit accumulates a value corresponding to the throttle opening degree during gear shift.

6. A gear shift time automatic adjusting apparatus according to claim 2, wherein when the out-of shelf condition is detected by the out-of shelf detecting unit, said gear shift load accumulating unit sets the accumulated value to an initial value.

7. A gear shift time automatic adjusting apparatus according to claim 2, wherein said first engaging oil pressure setting unit reduces the first engaging oil pressure correction value as the accumulated value of the gear shift load accumulating unit becomes larger.

8. A gear shift time automatic adjusting apparatus according to claim 3, wherein said first engaging oil pressure setting unit reduces the first engaging oil pressure correction value as the accumulated value of the gear shift load accumulating unit becomes larger.

* * * * *